April 21, 1931.  A. OLSON  1,801,685

GYPSUM MIXER

Filed July 15, 1929  2 Sheets-Sheet 1

ALBERT OLSON,
INVENTOR

BY Victor J. Evans
ATTORNEY

April 21, 1931.  A. OLSON  1,801,685
GYPSUM MIXER
Filed July 15, 1929  2 Sheets-Sheet 2

ALBERT OLSON,
INVENTOR

BY Victor J. Evans
ATTORNEY

Patented Apr. 21, 1931

1,801,685

UNITED STATES PATENT OFFICE

ALBERT OLSON, OF TOMPKINSVILLE, NEW YORK

GYPSUM MIXER

Application filed July 15, 1929. Serial No. 378,381.

This invention relates to improvements in mixing and dumping apparatus and has particular reference to a gypsum mixer.

The primary object of the invention resides in a mixing apparatus in which the raw gypsum, water and other ingredients are placed and thoroughly mixed to a plastic state, and which mixture may be kept in a plastic condition ready for use, at which time it may be dumped by tilting the mixing cylinder.

Another object of the invention is to provide a gypsum mixer which includes a nonrotatable cylinder into which the gypsum ingredients are placed and in which reversely rotatable agitating blades are arranged to effectively stir the mass, the blades being adjustable to vary the pitch thereof depending upon the consistency of the mixture desired.

A further object of the invention is the provision of a tiltable mixing cylinder having driven rotatable blades therein, and means whereby the power to the blades may be disconnected before the cylinder may be tilted to empty the contents thereof.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
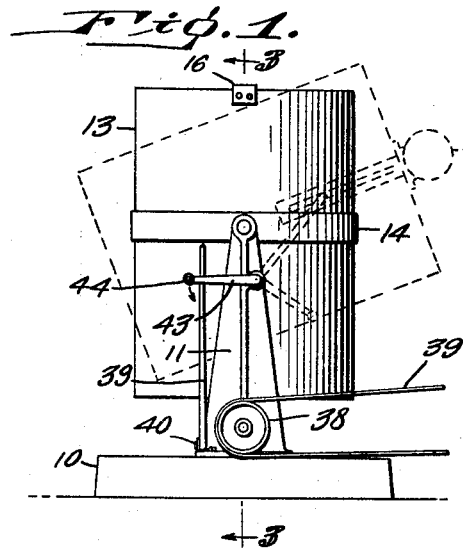
Figure 1 is a side elevation of my invention showing the tiltable cylinder in a tilted position in dotted line.
Figure 2:
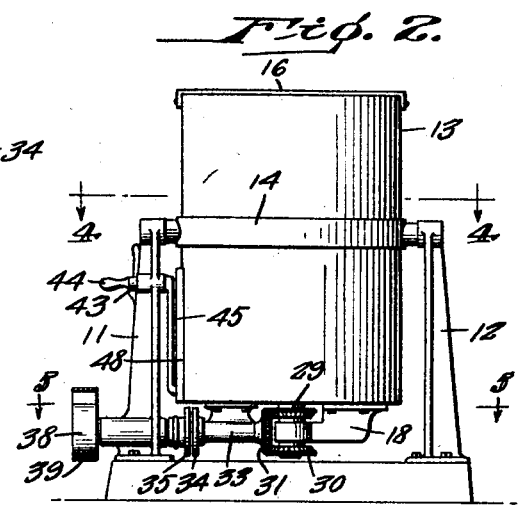
Figure 2 is a front elevational view of the same.
Figure 3:
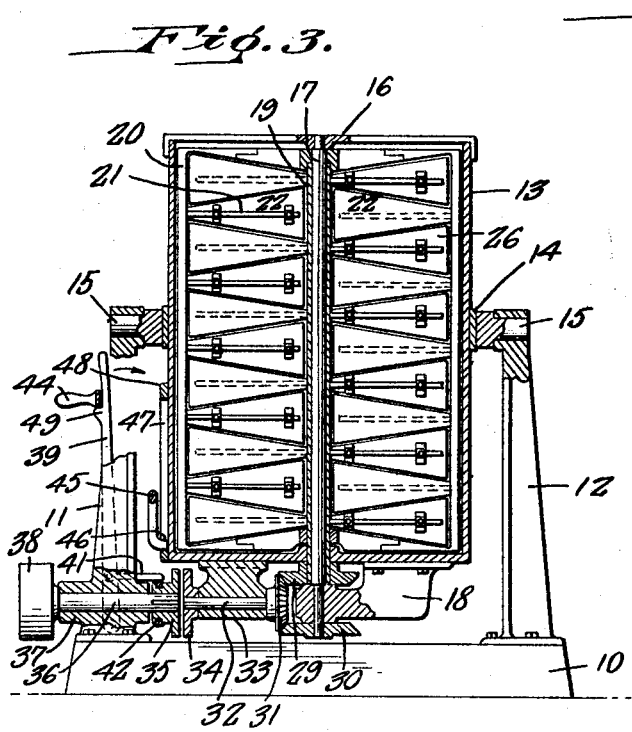
Figure 3 is an enlarged vertical transverse sectional view on the line 3—3 of Figure 1.
Figure 6:
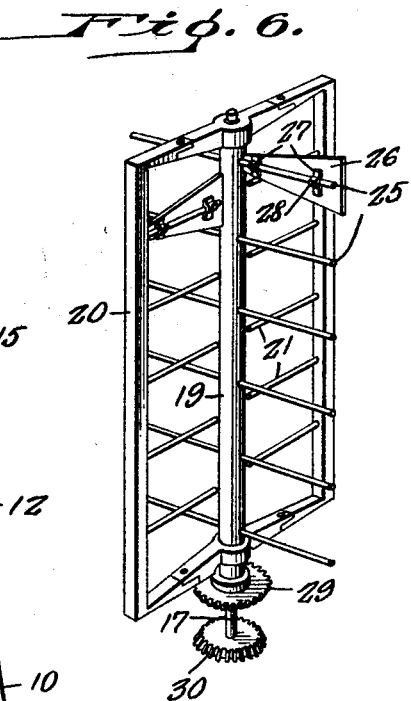
Figure 6 is a detail perspective view of the agitating mechanism.
Figure 4:
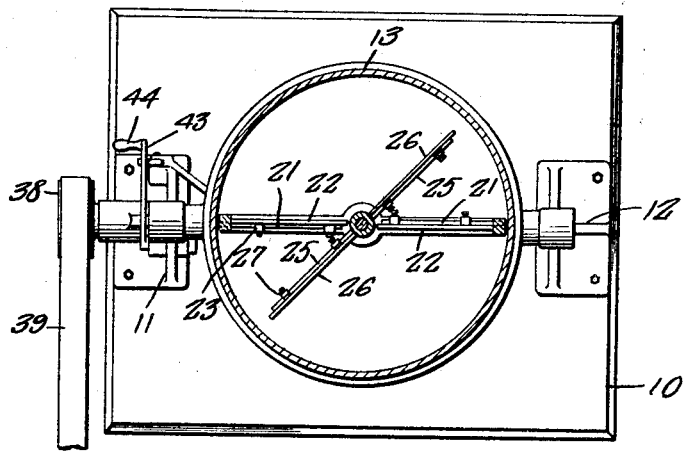
Figure 4 is an enlarged horizontal sectional view on the line 4—4 of Figure 2.
Figure 5:
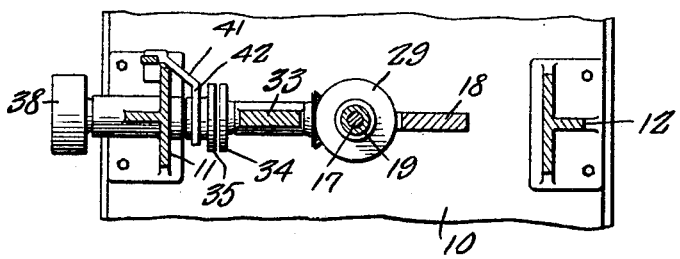
Figure 5 is a horizontal sectional view on the line 5—5 of Figure 2.
Figure 7:
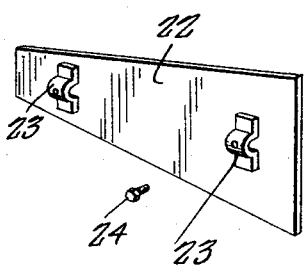
Figure 7 is a detail perspective view of one of the agitating blades per se.

Referring to the drawings by reference characters, the numeral 10 designates a rectangular base which supports bearings 11 and 12 which rise vertically from said base. Journalled in the bearings 11 and 12 is a tiltable cylinder 13 open at its top end and closed at its bottom, while secured to the cylinder exteriorly of the side wall and above the center thereof is a band 14 having diametrically opposed trunnions 15 which trunnions are turnably mounted in the respective bearings 11 and 12. By pivoting the cylinder above its center, the closed bottom end overbalances the top end and the same tends to assume a vertical position as shown in full lines in the drawing.

Bridging the open end of the cylinder is a cross bar 16 which serves as a bearing for the upper end of an inner rotatable shaft 17, the lower end of the shaft passing beyond the bottom of the cylinder and journalled in a bearing 18 fixed to said bottom. The shaft 17 extends axially through the cylinder and surrounding the same is a rotatable tubular shaft 19 adapted to rotate in a direction opposite to the direction of rotation of the shaft 17. Fixedly connected adjacent the upper end of the shaft 17 to rotate therewith is a rectangular frame 20, the vertical sides of which are adapted for scraping contact with the inner side walls of the cylinder. Extending inwardly from the sides of the frame 20 are spaced rods 21 which support blades 22. The blades 22 are mounted on the rods by providing bearings 23 on one of the sides of the blades through which the rods 21 pass while set screws 24 are threaded into the bearings into clamping engagement with the rods to secure the blades 22 in a fixed position. By this arrangement, the angularity or pitch of the blades may be varied to suit the consistency of the mixture, as hereinbefore referred to.

Extending outwardly from the tubular shaft 19 on a plane intermediate the plane of the rods 21, are similar rods 25 which support blades 26. The blades 26 like the blades 22 have one of their side faces provided with bearings 27 through which the rods 25 pass and are secured by set screws 28. The angularity of the blades 26 may also be varied by loosening the set screws and turning the blades upon their respective rods after which the set screws are tightened up. In the drawings, the blades are shown as having converging sides, or in plan they appear to be of a truncated cone shape and are shown in an adjusted position whereby their full face meets the mass to be mixed during operation of the apparatus. The blades 22 carried by the frame are out of the path of the blades 26 carried by the tubular shaft 19 so that they will clear each other during reverse rotation of the shafts 17 and 19.

Fixed to the lower end of the tubular shaft 19 is a beveled gear 29 while fixed to the lower end of the shaft 17 is a similar beveled gear 30, both of these beveled gears being in constant mesh with a driving beveled gear 31 fixed to one end of a driven shaft 32 journalled in a bearing 33 fixed to the bottom end of the mixing cylinder. The other end of the shaft 32 carries a clutch element 34 for coacting engagement by a slidable clutch element 36 slidably mounted on the inner end of a drive shaft 36 journalled in a bearing 37 formed in the bearing post 11. The outer end of the drive shaft 36 carries a pulley 38 which may be connected up with a source of power by an endless belt 39.

For the purpose of sliding the slidable clutch element 35 into co-acting engagement with the clutch element 34, I provide an actuating lever 39 pivoted to the bearing 11 as at 40 and to which an arm 41 is pivotally connected, the said arm terminating with an angular yoke 42 which is operatively connected to the sliding clutch element 35. It will be appreciated that by manually moving the actuating lever 39 back and forth, the clutch element 35 may be engaged and disengaged with the mating clutch element 34 on the driven shaft 32.

For the purpose of tilting the cylinder in order to empty the contents thereof, I provide manually operable tilting means which includes an actuating crank lever 43 pivoted to the bearing 11, the outer arm of the crank having an actuating handle 44 while the inner arm 45 of the crank terminates in an inwardly extending finger 46 which is movable in a slot 47 provided in a plate 48 fixed to the outer side wall of the cylinder 13. It will be appreciated that by pushing down upon the handle 44 in the direction of the arrow shown in Figure 1, the crank lever will swing the cylinder 13 to the position shown in Figure 1 of the drawing wherein the open end of the cylinder is in such position that the contents therein will gravitationally drop.

It will be appreciated that in order to tilt the cylinder to a dumping position, the clutch elements must be disengaged and for the purpose of assuring that the said clutch elements are disengaged, I provide a means whereby the tilting lever 43 cannot be actuated until the lever 39 has been pushed inwardly to disengage the sliding clutch element from the clutch element 34. To accomplish this, I provide a shoulder 49 on the lever 39 upon which the outer arm of the crank 43 rests when the lever 39 is in a position where the two clutch elements are engaged. The shoulder prevents downward movement of the crank, so that the lever 39 must be actuated to disengage the clutch before the crank 43 can be operated to tilt the tiltable cylinder 13.

In operation, assume that the cylinder is in a vertical position as shown in full lines in the drawing and the cylinder is filled with the ingredients necessary in the mixing of gypsum or the like. With the clutch elements in an engaged position, power is transmitted from the drive shaft to the axially aligned shaft 32 and the gear 31 imparts reverse rotation to the gears 29 and 30 respectively connected to the tubular shaft 19 and inner shaft 17. The blades 25 and 22 being respectively connected to the shafts 19 and 17 will likewise turn in opposite direction, thus mixing the mass within the cylinder to the proper consistency. When the mass is ready for use, the same may be dumped by tilting the cylinder in the manner hereinbefore described.

Figure 8:
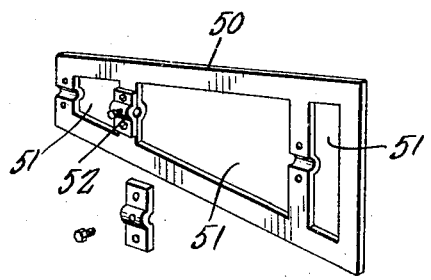
Figure 8 is a detail perspective view of a modified form of the agitating blade.

In Figure 8 of the drawings, I have shown a slightly modified form of blade which is designated by the numeral 50 which is of a shape similar to the shape of the blades 22 and 25 but instead of being a solid blade, the same is provided with cut-out openings 51. Bearings 52 similar to the bearings 23 and 27 are provided for mounting the blade upon its supporting load. A blade of this type does not set up the same resistance as a solid blade but may be found useful depending upon the substance to be mixed.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a mixing apparatus, a non-rotatable tiltable cylinder open at its top, reversely rotatable blades within said cylinder, power driven means for simultaneously rotating said blades, manually operable means for connecting and disconnecting said power driven means with said reversely rotatable blades, and manually operable tilting means for moving said tiltable cylinder to and from dumping position only after said first manually operable means has been actuated to disconnect said power driven means from said reversely rotatable blades.

2. In a mixing apparatus comprising a cylindrical container, axially disposed reversely revolvable shafts, one of the latter being tubular and external to the other, a rectangular frame carried on the inner shaft, practically radially disposed rods rigid at their outer ends with said frame, practically radially disposed rods rigid at their inner ends with said tubular shaft and disposed in the spaces between said first rods, flat blades adjustably carried on the respective rods, and means including screws for retaining said blades in selected positions, whereby said respective blades are settable to mutually pass in edge adjacent or in spaced relation during revolution of said shafts.

3. A mixing apparatus comprising a base, a cylinder tiltably mounted upon said base and open at its top end, a rotatable shaft journalled within said cylinder, a rectangular frame fixed to said shaft for scraping engagement with the inner side wall of said cylinder, spaced blades extending inwardly from the sides of said frame, a tubular shaft journalled in said cylinder and through which said shaft extends, spaced blades mounted on said tubular shaft on a plane out of the path of said first blades, means for imparting simultaneous reverse rotation to said shaft and said tubular shaft, and means for tilting said cylinder to empty any contents therein through the open top end of said cylinder.

4. A mixing apparatus comprising a base, a cylinder tiltably mounted upon said base and open at its top end, a rotatable shaft journalled within said cylinder, a rectangular frame fixed to said shaft for scraping engagement with the inner side wall of said cylinder, spaced blades extending inwardly from the sides of said frame, a tubular shaft journalled in said cylinder and through which said shaft extends, spaced blades mounted on said tubular shaft on a plane out of the path of said first blades, means for adjusting the pitch of all of said blades, means for adjusting simultaneous reverse rotation to said shaft and said tubular shaft, and means for tilting said cylinder to empty any contents therein through the open top end of said cylinder.

5. A mixing apparatus comprising a base, a cylinder mounted upon said base and open at its top end, a rotatable shaft journalled within said cylinder, a rectangular frame fixed to said shaft for scraping engagement with the inner side wall of said cylinder, spaced blades extending inwardly from the sides of said frame, a tubular shaft journalled in said cylinder and through which said shaft extends, spaced blades mounted on said tubular shaft on a plane out of the path of said first blade, and means for imparting simultaneous reverse rotation to said shaft and said tubular shaft.

6. In a mixing apparatus, a base including bearings, a cylinder open at one end, trunnions extending from said cylinder and turnable in bearings whereby said cylinder is tiltably mounted thereon, and manually operable means for tilting said cylinder to and from a vertical position, said means including a crank handle journalled in the other bearing on said base, a plate secured to the side wall of the cylinder and having therein a slot adjacent the bottom of the cylinder, and an arm terminating in an angular finger, which latter extends into said slot.

7. A mixing apparatus comprising a base, bearings rising from said base, a cylinder journalled in said bearings for turning movement, an inner shaft journalled in said cylinder, a tubular shaft journalled in said cylinder and through which said inner shaft extends, sets of agitating blades turnable with said inner shaft and tubular shaft, each set being out of the path of the other set, a bevel gear fixed to the lower end of said inner shaft, a bevel gear fixed to the end of said tubular shaft, a driven rotatable shaft journalled in a bearing on the underside of said cylinder, a bevel gear fixed to one end thereof in constant meshing engagement with the two aforementioned bevel gears to simultaneously rotate the same in opposite directions upon rotation of said driven rotatable shaft, a clutch element fixed to the other end of said driven shaft, a rotatable drive shaft mounted in axial alignment with said driven rotatable shaft, a slidable clutch element mounted on said drive shaft for co-action with said fixed clutch element, manually operable means for engaging and disengaging said slidable clutch element with said fixed clutch element, and manually operable means for tilting said cylinder when said clutch elements are in disengaged position.

8. In a mixing device comprising a cylindrical container having an open top, a rotatable shaft centrally journalled in said cylinder, a rectangular frame fixed to said shaft, a reversely revolvable tubular shaft also journalled in said cylinder and through which said first shaft extends, means disposed below the cylinder for revolving said shafts in reverse directions, transversely aligned triangular blades having points thereof rigid with and adjoining said frame, said triangular blades having their bases disposed adjacent said tubular shaft, and transversely aligned triangular blades having points thereof rigid with and adjoining said tubular shaft, said latter triangular blades having their bases disposed adjacent said frame, whereby on revolution of said shafts the edges of the respective blades mutually pass in substantial adjacent relation.

In testimony whereof I hereby affix my signature.

ALBERT OLSON.